(12) United States Patent
Nagao et al.

(10) Patent No.: US 8,236,398 B2
(45) Date of Patent: Aug. 7, 2012

(54) CUP-TYPE POLYPROPYLENE CONTAINER AND METHOD OF MOLDING THE SAME

(75) Inventors: Jotaro Nagao, Yokohama (JP); Norihisa Hirota, Yokohama (JP); Yutaka Asano, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 703 days.

(21) Appl. No.: 12/438,483

(22) PCT Filed: Sep. 10, 2007

(86) PCT No.: PCT/JP2007/068005
§ 371 (c)(1),
(2), (4) Date: Feb. 23, 2009

(87) PCT Pub. No.: WO2008/032841
PCT Pub. Date: Mar. 20, 2008

(65) Prior Publication Data
US 2010/0233398 A1    Sep. 16, 2010

(30) Foreign Application Priority Data

Sep. 12, 2006   (JP) ................................ 2006-246448

(51) Int. Cl.
*B29D 22/00* (2006.01)
*B29D 23/00* (2006.01)
*B32B 1/08* (2006.01)
(52) U.S. Cl. ..................................................... 428/35.7
(58) Field of Classification Search ................... 428/35.7
See application file for complete search history.

(56) References Cited

U.S. PATENT DOCUMENTS

| | | | |
|---|---|---|---|
| 4,778,551 A | 10/1988 | Coffman | |
| 4,913,871 A * | 4/1990 | Kawaguchi et al. | 264/294 |
| 4,997,707 A | 3/1991 | Otawa et al. | |
| 5,019,433 A * | 5/1991 | Briggs et al. | 428/35.7 |
| 5,110,280 A | 5/1992 | Kawaguchi et al. | |
| 5,249,447 A * | 10/1993 | Aizawa et al. | 72/46 |
| 2007/0275197 A1* | 11/2007 | Chow et al. | 428/35.7 |

FOREIGN PATENT DOCUMENTS

| | | |
|---|---|---|
| GB | 2 178 359 A | 2/1987 |
| JP | 62-090210 A | 4/1987 |
| JP | 62-273835 A | 11/1987 |

(Continued)

OTHER PUBLICATIONS

J. X. Li and W.L. Cheung, Polymer vol. 39, No. 26, pp. 6935-6840.*

(Continued)

*Primary Examiner* — Michael C Miggins
(74) *Attorney, Agent, or Firm* — Sughrue Mion, PLLC

(57) ABSTRACT

A cup-type polypropylene container obtained by compression-molding a polypropylene and having at least a body portion and a bottom portion, wherein the body portion has a thickness of not larger than 1.0 mm and a value $K_1$ relating to peak intensity ratio and/or a value $K_2$ relating to diffraction intensity ratio as defined herein. The cup-type polypropylene container features improved falling strength in the body portion and at the open end such as flange, improved pressure strength and excellent mechanical strength in the body portion. Also disclosed is a method of molding the cup-type polypropylene container.

8 Claims, 4 Drawing Sheets

FOREIGN PATENT DOCUMENTS

| | | |
|---|---|---|
| JP | 02-145331 A | 6/1990 |
| JP | 04-169207 A | 6/1992 |
| JP | 06-002359 B2 | 1/1994 |
| JP | 08-072082 A | 3/1996 |
| JP | 2005-313618 A | 11/2005 |
| JP | EP 1 985 430 A1 * | 10/2008 |
| WO | 2006/040627 A2 | 4/2006 |
| WO | WO 2007/094518 * | 8/2007 |

OTHER PUBLICATIONS

Yonggang Shangguan, Yihu Song, Mao Peng, Bingpeng Li, Qiang Zheng, European Polymer Journal 41 (2005) 1766-1771.*

* cited by examiner (A)

(B)

CUP-TYPE POLYPROPYLENE CONTAINER AND METHOD OF MOLDING THE SAME

TECHNICAL FIELD

The present invention relates to a cup-type polypropylene container and to a method of molding the same. More specifically, the invention relates to a cup-type polypropylene container featuring improved mechanical strength such as falling strength and pressure strength and to a method of molding the same.

BACKGROUND ART

Polypropylene has heretofore been widely used in the field of packing containers, and has been formed into contains of various forms as well as into cup-type containers. The cup-type containers are usually formed by the injection molding or by the compressed air molding. JP-B-6-2359 (hereinafter often referred to as "patent document 1") is proposing the formation by the compression molding.

DISCLOSURE OF THE INVENTION

The cup-type polypropylene containers formed by the injection molding or by the compressed air molding, however, have high anisotropy in the molecular orientation of the containers, and fail to exhibit falling strength and pressure strength to a sufficient degree and are not still satisfactory, either, from the standpoint of mechanical strength of the containers.

In the case of the compression molding disclosed in the above patent document 1, too, space molding the side walls is limited earlier than the fluidization of resin. Therefore, the resin is permitted to flow in limited space only, giving rise to the occurrence of anisotropy in the molecular orientation still making it difficult to obtain falling strength and pressure strength to a sufficient degree.

Further, articles formed by the injection molding and compressed air molding are necessarily accompanied by the generation of scrap resin. It is, therefore, desired to efficiently form polypropylene cups without generating scrap resin.

That is, when formed by the injection molding, scrap resin necessarily results from the solidified resin remaining in the gate or in the runner which is a port for charging the resin into the cavity. When formed by the compressed air molding, on the other hand, scrap resin results from the remainder after the blank for molding cups is cut out from the resin sheet.

It is therefore an object of the present invention to provide a cup-type polypropylene container featuring improved falling strength and pressure strength.

Another object of the present invention is to provide a method of molding a cup-type polypropylene container which can be formed without generating scrap resin.

According to the present invention, there is provided a cup-type polypropylene container obtained by compression-molding a polypropylene and having at least a body portion and a bottom portion, wherein the body portion has a thickness of not larger than 1.0 mm and a value $K_1$ represented by the following formula (1), $$K_1 = P_1/P_2 \quad (1)$$

wherein $P_1$ and $P_2$ are, respectively, a peak intensity at a diffraction angle $2\theta=14.5°$ and a peak intensity at a diffraction angle $2\theta=17.2°$ in the peak intensity distribution in the x-direction of a Debye ring obtained by measuring the diffraction intensity while defining the circumferential direction of a test piece cut out from the body portion of the container to be x, the direction of height thereof to be y, and by causing X-ray to fall perpendicularly to the xy-plane of the test piece, lying in a range of 0.5 to 1.0 and/or a value $K_2$ represented by the following formula (2)

$$K_2 = H\beta_1/(H\beta_1 + H\alpha_1 + H\alpha_2 + H\alpha_3) \quad (2)$$

wherein $H\beta_1$, $H\alpha_1$, $H\alpha_2$ and $H\alpha_3$ are values obtained by subtracting the diffraction intensity of an amorphous portion from a peak intensity at a diffraction angle $2\theta=16.3°$, from a peak intensity at a diffraction angle $2\theta=14.5°$, from a peak intensity at a diffraction angle of 17.2° and from a peak intensity at a diffraction angle of 18.8° in the peak intensity distribution in the x-direction of a Debye ring obtained by measuring the diffraction intensity while defining the circumferential direction of a test piece cut out from the body portion of the container to be x, the direction of height thereof to be y, and by causing X-ray to fall perpendicularly to the xy-plane of the test piece, which is larger than 0 in at least part of the body portion.

In the cup-type polypropylene container of the present invention, it is desired that:

1. A flange portion is formed, the flange portion having a value $K_1$ of 0.5 to 1.5;
2. At least the bottom portion and the body portion of the container have a multi-layer structure;
3. The multi-layer structure includes at least inner and outer layers of the polypropylene and an intermediate layer of other thermoplastic resin, the inner and outer layers completely covering the intermediate layer preventing the intermediate layer from being exposed to the surface of the container; and
4. The intermediate layer comprises an ethylene/vinyl alcohol copolymer having an ethylene copolymerization ratio of less than 32 mol %.

According to the present invention, there is provided a method of molding a cup-type polypropylene container by at least introducing a molten resin mass of a polypropylene into a lower metal mold and compressing the molten resin mass by an upper metal mold and the lower metal mold, wherein a portion that becomes an open end or a part thereof is defined after the molten resin mass is introduced into the lower metal mold but before the upper metal mold or the lower metal mold is moved, and the compression molding is effected at the time of moving the upper metal mold or the lower metal mold while varying the thickness of the portions that form the bottom portion and the body portion of the container.

In the compression-molding method of the present invention, it is desired that the molten resin mass is the one having a multi-layer structure extruded by a die head having a multi-layer structure.

The cup-type polypropylene container having the value $K_1$ and/or the value $K_2$ within the ranges of the present invention features improved falling strength in the body portion and at the open end such as flange, improved pressure strength in the body portion and excellent mechanical strength.

According to the method of molding the cup-type container of the present invention, the cup-type container having the above-mentioned properties can be formed maintaining good dimensional precision without generating scrap resin that occurs when the cup-type container is formed by the compressed air molding or by the injection molding, offering an advantage in economy, too.

The cup-type polypropylene container of the present invention is obtained by the compression molding and includes at least the body portion and the bottom portion, wherein a first feature resides in that the body portion has a thickness of not larger than 1.0 mm and a second feature resides in that the value $K_1$ represented by the above formula (1) is in a range of 0.5 to 1.0.

As described above, the cup-type container is formed, generally, by the injection molding, compressed air molding or compression molding. In all of the cup-type polypropylene containers obtained by the above conventional forming methods, however, anisotropy occurs in the molecular orientation, and a sufficient degree of strength cannot be obtained.

The orientation of fine crystals of crystalline high molecules such as of polypropylene can be known by a method of measuring the X-ray diffraction intensity. Generally, it has been known that the formed articles of polypropylene exhibit peaks at a diffraction angle 2θ=14.5° (Miller indices 110), at a diffraction angle 2θ=17.2° (Miller indices 040), at a diffraction angle 2θ=13.0° (Miller indices 130) and at 2θ=21.8° (Miller indices 111), and the peak intensity differs depending upon the molding method.

In the present invention, attention was given to a peak intensity $P_1$ at a diffraction angle 2θ=14.5° representing the diffraction on the crystal surface of a Miller indices (110) and a peak intensity $P_2$ at a diffraction angle 2θ=17.2° representing the diffraction on the crystal surface of a Miller indices (040) in the peak intensity distribution on the equator line (x-direction) of a Debye ring obtained by measuring the diffraction intensity while defining the circumferential direction of a test piece cut out from the body portion of the cup-type container to be x, the direction of height thereof to be y, and by causing X-ray to fall perpendicularly to the xy-plane of the test piece. It was discovered that the cup-type container having a ratio $K_1$ of $P_1$ and $P_2$ lying in a range of 0.5 to 1.0 exhibits excellent mechanical strength.

In the present invention, it will become obvious from the results of Examples appearing later that the cup-type container having the value $K_1$ in a range of 0.5 to 1.0 and, preferably, in a range of 0.8 to 1.0 exhibits particularly excellent mechanical strength.

That is, in the measurement of breaking elongation, it is obvious that the cup-type container obtained by the compressed air molding and having a portion where the value $K_1$ is larger than 1.0 elongates greatly in the direction of height but does not almost elongate in the circumferential direction, i.e., is very brittle in the circumferential direction (Comparative Examples 1 and 2). It is, further, obvious that the cup-type container obtained by the injection molding and having the value $K_1$ smaller than 0.5 does not almost elongate either in the direction of height or in the circumferential direction, and is very brittle (Comparative Example 2). Further, the cup-type container obtained by the compression molding disclosed in the above patent document 1 elongates to some extent in the direction of height but is very brittle in the circumferential direction (Comparative Example 4).

On the other hand, it is obvious that the cup-type container obtained by the compression molding and having the value $K_1$ in the range of 0.5 to 1.0 uniformly elongates in both the direction of height and the circumferential direction exhibiting uniform strength in both of these directions (Examples 1 to 4).

It has been known that the crystalline structure of the polypropylene includes α crystals, β crystals and γ crystals. The β crystals have a melting point lower than that of the α crystals, have a crystal size larger than that of the α crystals, and have a low density. Therefore, the β crystals have such features as low flexural modulus of elasticity, high breaking strength and high shock resistance, and are superior to the α crystals from the standpoint of rigidity and mechanical strength of the container. Under the above circumstances, the present inventors have paid attention to, particularly, the β crystals in the above crystalline structure and have discovered the fact that the container exhibits excellent mechanical strength when the β crystals are made present in at least part of the body portion of the cup-type polypropylene container.

That is, the present inventors have discovered the fact that the cup-type polypropylene container obtained by the compression molding, including at least the body portion and the bottom portion, and having a thickness in the body portion of not larger than 1.0 mm, exhibits excellent mechanical strength like that of the cup-type polypropylene container in which the value $K_1$ is in the range of the present invention, owing to the formation of the β crystals, i.e., since the value $K_2$ (content of β crystals) represented by the above formula (2) is larger than 0 in at least part of the body portion.

As described above, the crystalline structure of the polypropylene includes α crystals, β crystals and γ crystals. In this crystalline structure, the α crystals are most stable. The α crystals occupy most of the portions of a general cup-type polypropylene container, and it is difficult to form the cup-type container which is formed by the β crystals. That is, in the compressed air molding, the sheet is formed as α crystals being highly oriented and crystallized. It is difficult to transform the α crystals into the β crystals. In the injection molding, on the other hand, the resin is oriented and crystallized to a large extent due to the fluidization and orientation, and the β crystals are not formed. In the compression molding, on the other hand, the β crystals tend to be easily formed since a high pressure is maintained and the β crystals are formed in a shearing layer receiving a shearing force between the skin layer and the core layer.

As the polypropylene, further, there are generally used homopolypropylene, block polypropylene and random propylene, and it has been known that the β crystals tend to be formed in this order.

According to the present invention, the flow and orientation of the resin are controlled by the compression molding which is more suited for forming the β crystals than the other molding methods, and a container is formed having crystals oriented to a suitable degree; i.e., the β crystals are formed in the body portion of the cup-type polypropylene container making it possible to impart the above-mentioned excellent mechanical strength.

It will become obvious from the results of Examples appearing later that the cup-type container of the invention having a portion where the value $K_2$ is larger than zero ($K_2>0$) in the body portion of the container exhibits particularly excellent mechanical strength.

It is obvious that the cup-type container obtained by the compressed air molding without the portion of $K_2>0$ in the body portion of the container elongates to a large extent in the direction of height but does not almost elongate in the circumferential direction in the measurement of breaking elongation, and is very brittle in the circumferential direction (Comparative Example 1). It is, further, obvious that the cup-type container obtained by the injection molding does not almost elongate either in the direction of height or in the circumferential direction, and is very brittle (Comparative Examples 2 and 3). The cup-type container obtained by the compression molding described in the patent document 1 has a portion where $K_2>0$ but its ratio is very smaller than that of Example 3 that uses the homopropylene, and fails to exhibit excellent mechanical strength (Comparative Example 4).

It is, on the other hand, obvious that the cup-type containers obtained by the compression molding and having a portion where $K_2>0$ in the body portion of the containers elongate nearly uniformly in the direction of height and in the circumferential direction exhibiting uniform strength in these directions (Examples 1 to 4).

Further, the cup-type container of the invention is advantageous not only in improving the mechanical strength but also from the standpoint of transparency.

The cup-type container of the invention has transparency superior to that of the cup-type container having a low internal haze that is formed by the compressed air molding presumably due to the reasons described below. That is, according to the compressed air molding, the resin sheet is pushed by a plug and is, thereafter, molded by blowing. Therefore, the outer surface is shaped by the metal mold but the inner surface is not formed by the metal mold. According to the method of the present invention, on the other hand, the inner and outer surfaces are shaped by the metal molds. Therefore, the surface roughness on the inner surface is smaller than that of the compressed air molding and, as a result, the transparency is improved.

In the method of compression molding a cup-type polypropylene container of the invention having the above-mentioned oriented properties by introducing a molten resin mass comprising at least a propylene into a lower metal mold and, thereafter, compressing the molten resin mass by an upper metal mold and by the lower metal mold, it is important to define a portion that becomes an open end or to define a part thereof after the molten resin mass has been introduced into the lower metal mold but before moving the upper metal mold or the lower metal mold, and to effect the compression molding while varying the thickness of the portions that form the bottom portion and the body portion of the container at the time of moving the upper metal mold or the lower metal mold.

FIGS. 1 and 2 show the values $K_1$ and $K_2$ at a height h from the bottom portion of the cup-type containers having a height H of 61 mm and a mouth diameter D of 95 mm formed by the compressed air molding method, the injection molding method, and the compression molding method which is the method of the present invention. As will be obvious from FIGS. 1 and 2 and from the results of Examples appearing later, the cup-type container obtained by the compressed air molding has the value $K_1$ which is larger than 1.0 in any part of the body of the container but has no portion where $K_2>0$ (Comparative Example 1). The cup-type container obtained by the injection molding has a portion where the value $K_1$ is smaller than 0.5 in the body except the flange portion but has no portion where $K_2>0$ in the body of the container (Comparative Examples 2 and 3); i.e., the cup-type container of the present invention is not obtained.

Even when the cup-type container is obtained by the compression molding, anisotropy takes place in the molecular orientation and the value $K_1$ fails to lie in the range specified by the present invention if the compression molding is carried out while varying the thickness of the bottom portion of the container and if the thickness of the body of the container has been determined prior to flowing the resin into the space that defines the thickness according to the conventional method of JP-B-6-2359 described above.

According to the present invention, on the other hand, only a portion for molding the flange or part thereof is defined prior to moving the upper metal mold or the lower metal mold, and the thickness is allowed to vary not only in the bottom portion but also in the body portion and, finally, the thickness of the body portion is defined. Therefore, the body portion provides a large flow path for the molten resin suppressing the orientation due to the flow.

Accordingly, the cup-type container of the present invention, irrespective of if it is of a single-layer structure or a multi-layer structure, has a value $K_1$ of from 0.5 to 1.0 except in the flange portion, or has the β crystals formed in the body portion of the container, and includes a portion where $K_2>0$ in the body portion. Therefore, the obtained cup-type container exhibits the above-mentioned excellent mechanical strength.

In the cup-type container of the invention, if the value $K_1$ is satisfied, then the value $K_2$ is satisfied. Upon so molding the cup-type container as to satisfy the value $K_1$, the above excellent mechanical properties and dimensional precision are obtained.

In the present invention, the values $K_1$ and $K_2$ which serve as indexes of the mechanical strength of the cup-type container are found from the bottom portion and the body portion excluding the flange portion. This is because, the properties of the container cannot be representatively expressed at the bottom portion and at the flange portion. That is, in the compressed air molding, the bottom portion and the flange portion are not elongated or oriented like the body portion. In the cup-type container obtained by the injection molding, further, the flange portion flows and is oriented in the radial direction, and exhibits a molecular orientation different from that of the body portion.

In the method of the invention, further, the resin flows smoothly in the portion where the body is formed, and even the flange portion has no large molecular orientation as that produced by the injection molding. In the cup-type container of the present invention, therefore, the value $K_1$ in the flange portion is in a range of 0.5 to 1.5. Therefore, the cup-type container of the present invention exhibits excellent mechanical strength even at the flange portion as compared to that of the cup-type containers obtained by any other forming method.

Moreover, the cup-type container obtained by the method of the present invention exhibits excellent dimensional precision. That is, as will be obvious from the results of Examples appearing later, the cup-type containers formed by the compressed air molding have a thickness that greatly disperses in the circumferential direction despite they are formed under the same conditions (Comparative Examples 1 and 2), whereas the cup-type container of the present invention has a thickness close to a designed size proving high dimensional precision.

BEST MODE FOR CARRYING OUT THE INVENTION

It is desired that the cup-type container of the present invention comprises at least a body portion and a bottom portion, the body portion having a thickness that has been decreased to be not larger than 1 mm and, particularly, in a range of 0.3 to 1.0 mm. It is, further, desired that a flange portion is formed at the open end. The cup-type container, however, may be the one without flange.

It is further desired that a ratio H/D of the height H of the cup and the mouth diameter D is in a range of not larger than 2.0.

Figure 4:
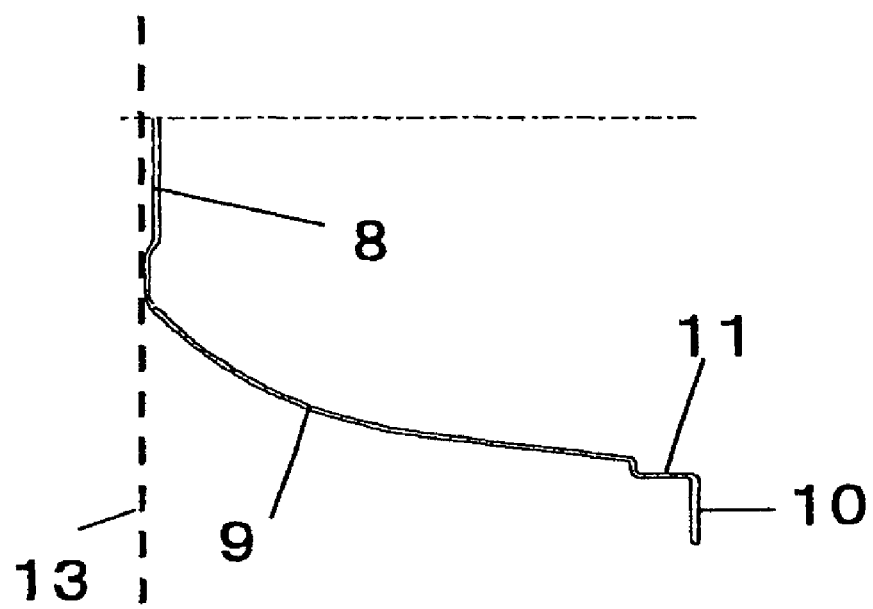
FIG. 4 is a view, wherein 4(A) is a sectional view of the containers of Examples 1 to 4 and Comparative Examples 1, 2 and 4, and 4(B) is a sectional view of the container of Comparative Example 3.
Figure 4:
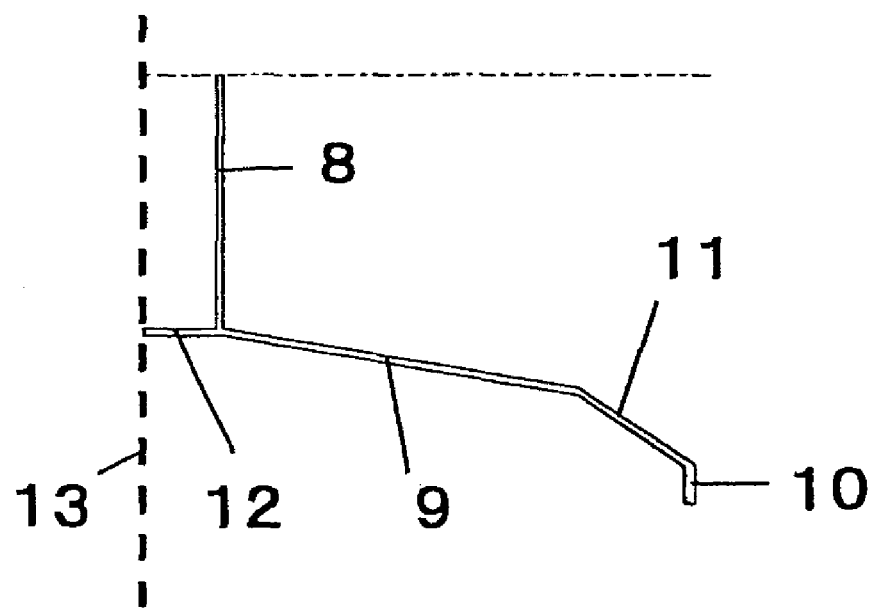

Further, the cup-type container may employ various structures. FIG. 4(A) shows an example though the invention is not limited thereto only. That is, a cup-type container of the invention shown in FIG. 4(A) comprises a body portion 9 and a bottom portion 8 continuous to the body portion 9, part of the bottom portion being placed on the grounding surface 13 when the product is erected. The body portion 9 is molding a mildly curved surface in the lower part thereof, and is molding a stacking portion 11 and a flange 10 in the upper part thereof.

As the polypropylene used for the cup-type container of the invention, there can be used a random or block copolymer containing other α-olefin such as ethylene in addition to homopolypropylene. From the standpoint of molding the β crystals, it is most desired to use the homopolypropylene. From the standpoint of compression formability, however, a random polypropylene can be preferably used.

It is desired that the polypropylene that is used has a melt flow rate (MFR) in a range of 5 g/10 min. to 30 g/10 min. and, particularly, in a range of 10 g/10 min. to 20 g/10 min.

In the cup-type container of the invention, the β crystals can be formed in the body portion of the container without particularly using a β crystal nucleating agent. However, a known β crystal nucleating agent may be blended within a range in which the formability of the cup-type container by the compression molding is not impaired.

The cup-type container of the invention may be of a single-layer structure of polypropylene or may be of a multi-layer structure with other thermoplastic resins. In this case, it is desired that the polypropylene forms the inner layer and/or the outer layer.

As the thermoplastic resin for constituting the multi-layer structure together with the polypropylene, various thermoplastic resins can be used if they are capable of being melt-formed. In the cup-type container of the invention, in particular, there can be used a barrier resin such as ethylene/vinyl alcohol copolymer, polyamide resin or cyclic olefin resin; or an oxygen-absorbing resin composition containing an oxygen absorber or an oxidizing organic component and a transition metal catalyst.

It is particularly desired that the cup-type container of the invention forms a multi-layer structure with an ethylene/vinyl alcohol copolymer. Among them, it is desired to use the ethylene/vinyl alcohol copolymer having an ethylene content of less than 32 mol % from the standpoint of gas-barrier property.

That is, the gas-barrier property of the ethylene/vinyl alcohol copolymer is affected by the ethylene content; i.e., more excellent gas-barrier property is exhibited with less ethylene content. However, the ethylene/vinyl alcohol copolymer with less ethylene content exhibits poor workability and heat stability. According to the present invention, however, the cup-type container is formed by the compression molding which permits the extrusion at a low temperature shortening the residence time. Besides, there is no need of effecting the secondary working, further, suppressing the flow and orientation. Therefore, the ethylene/vinyl alcohol copolymer can be used without being deteriorated.

The polypropylene or the resin or resin composition constituting other layers may be blended with known resin blending agents such as filler, coloring agent, heat stabilizer, aging stabilizer, antioxidant, anti-aging agent, photostabilizer, ultraviolet ray absorber, antistatic agent, lubricant such as metal soap or wax, resin or rubber for remolding according to a recipe known per se.

Figure 3:
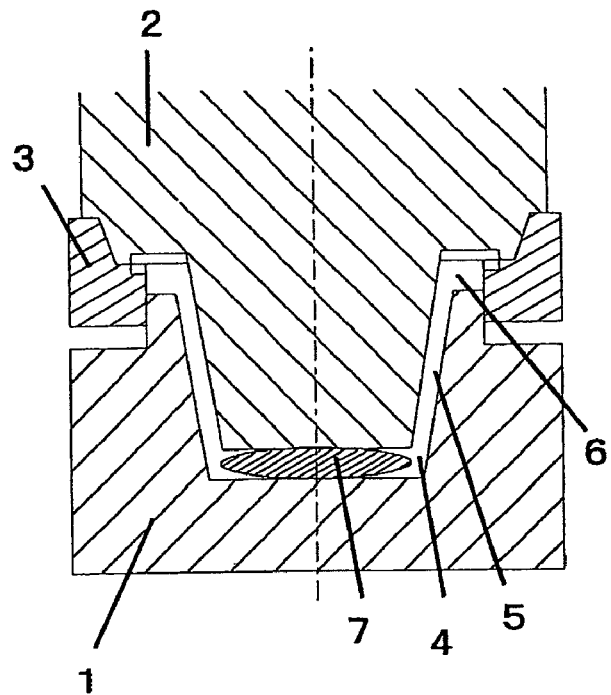
FIG. 3 is a diagram illustrating a molding method of the present invention.
Figure 3:
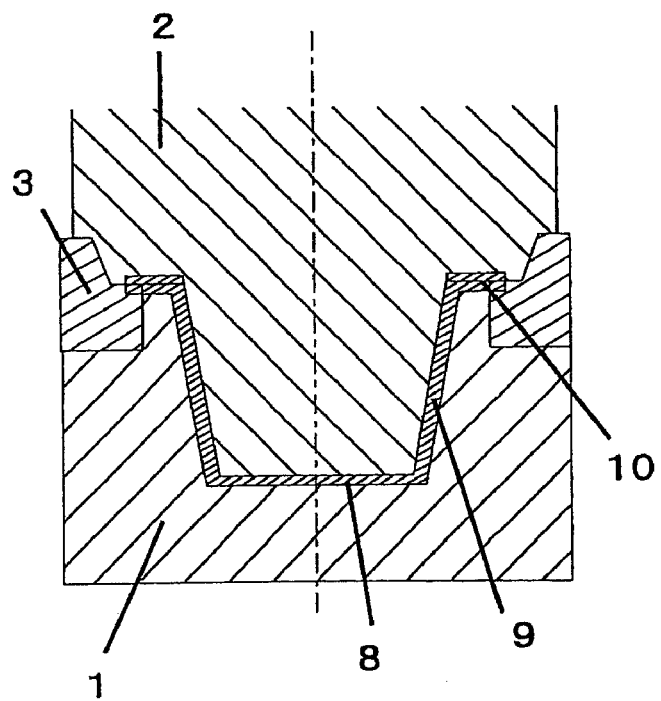

According to the method of molding the cup-type container of the invention, a melt of a polypropylene alone or the polypropylene and other thermoplastic resin is continuously extruded from an extruder, is cut by cutting means of a known synthetic resin feeding apparatus to prepare a molten resin mass in a molten state, which is, thereafter, held by holding means, and is introduced into a lower metal mold of a compression molding machine through guide means. Thereafter, the molten resin mass is compression molded by the upper metal mold and by the lower metal mold, and is cooled and solidified to form the cup-type container. According to the present invention, it is particularly important as shown in FIG. 3 to define a portion that becomes an open end or define a part thereof (flange-molding portion in FIG. 3) by a metal mold 3 that defines a space for molding the flange prior to extruding the molten resin mass 7 introduced in the cavity by lowering the core metal mold 2 (FIG. 3(A)) and, thereafter, to finally define the thickness of the body portion by gradually varying the thickness of a space 4 for molding the bottom portion and the thickness of a space 5 for molding the body, which are formed by the cavity 1 and the core metal mold 2, as the core metal mold 2 further descends. FIG. 3 shows a case where the lower metal mold is a female metal mold having a cavity and the upper metal mold is a male metal mold having a core. The present invention, however, can also be applied to even when the above relation is reversed, i.e., the lower metal mold is the male metal mold and the upper metal mold is the female metal mold.

As described above, the molten resin is smoothly flown to suppress the occurrence of flow and orientation and to suitably control the orientation of the formed cup, enabling the β crystals to be formed therein.

In the method of molding the cup-type container of the present invention, it is particularly desired that the molten resin mass in the molten state is a molten resin mass of a multi-layer structure extruded by a die head having a multi-layer structure. That is, a strand having a multi-layer structure extruded by the die head having the multi-layer structure is cut by cutting means of the synthetic resin feeding device. The molten resin mass that is cut is covered at its cut end with an outer layer, and forms a molten resin mass having a multi-layer structure including a core layer positioned at the center and a shell layer wrapping the core layer. If the molten resin mass having the above multi-layer structure is compression molded, the intermediate layer is not exposed on the surface, and the sanitation of the resin used as the intermediate layer does not have to be taken into consideration.

For example, if the desired cup-type container has a two-kind-three-layer structure with the polypropylene as the inner and outer layers, and with the barrier resin as the intermediate layer, then the molten resin mass may comprise a core layer of the barrier resin and shell layers of the polypropylene.

EXAMPLES

The invention will be further described by way of Examples.
1. Peak Intensity Ratios $K_1$ and $K_2$.
(1) Measuring apparatus and measuring conditions.
Transmission type micro X-ray diffraction apparatus RAD-RB (manufactured by Rigaku Co.)
Target: Cu Filter: Ni
Detector: Goniometer PSPC MDG Scaling gas: Ar 90%+CH$_4$ 10%
Scaling gas pressure: 180 kgf/cm$^2$
Voltage: 30 kV Current: 90 mA
Scanning rate: 2°/min.
Step width: 0.081°
Measuring time: 600 seconds (2) Calculation of peak intensity ratios K$_1$ by measuring the X-ray diffraction intensity.

Use was made of the above measuring apparatus and test pieces of body portions and flange portions cut out from the cup-type containers. The circumferential direction of the test piece was defined to be x, the direction of height thereof was defined to be y, and the X-ray was fallen perpendicularly to the xy-plane of the test pieces to measure the diffraction intensity.

In the peak intensity distribution in the x-direction of the Debye ring obtained at this time, a peak intensity P$_1$ was found at a diffraction angle 2θ=14.5° exhibiting the diffraction on the crystal surface of a Miller indices (110), and a peak intensity P$_2$ was found at a diffraction angle 2θ=17.2° exhibiting the diffraction on the crystal surface of a Miller indices (040). Further, a ratio of the peak intensity P$_1$ and the peak intensity P$_2$, i.e., K$_1$=P$_1$/P$_2$ was found. The number of the measured samples was N=3, and an average value thereof was used as a measured result.

To preclude the effect of X-ray scattering caused by the air, a scattering value measured in a state where no test piece was present was subtracted from the measured values of the peak intensities P$_1$, P$_2$, to thereby find the peak intensities P$_1$, P$_2$ stemming from the test pieces only.

The test pieces were cut out in a square shape of a side of 7 mm such that a height h from the grounding surface was the center of the test pieces.

Figure 1:
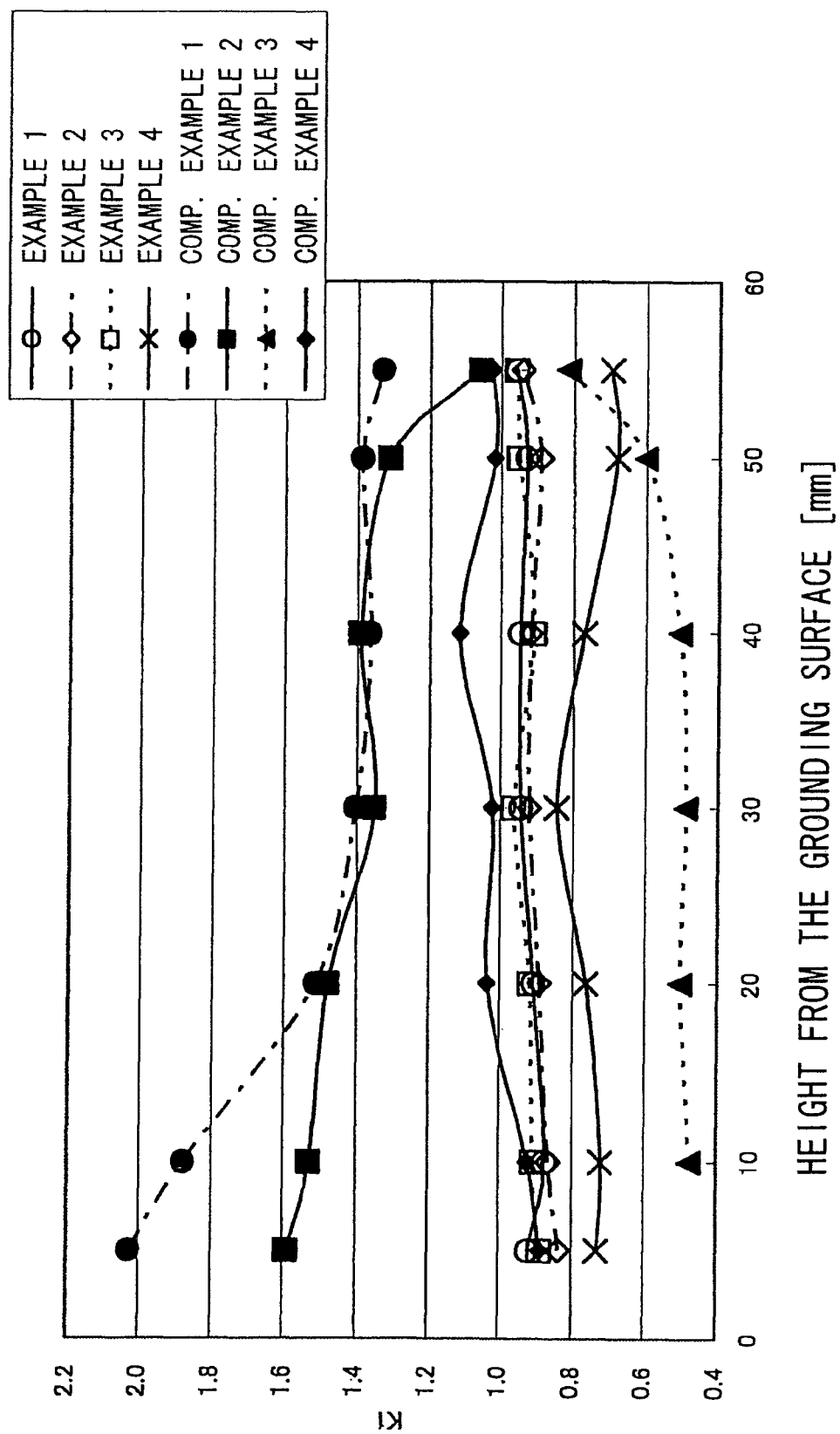
FIG. 1 is a diagram showing values of peak intensity ratios $K_1$ depending upon the heights of the cup-type containers formed by various molding methods.

The results were as shown in Table 1 and FIG. 1.

(3) Calculation of peak intensity ratios K$_2$ by measuring the X-ray diffraction intensity.

The X-ray diffraction intensities were measured under the same conditions as those of (2) above.

In the distribution of values obtained by subtracting the diffraction intensities of amorphous portions from the peak intensities in the x-direction of the Debye ring obtained at this time, there were found a peak intensity Hβ$_1$ at a diffraction angle 2θ=16.3° on the crystal surface of a Miller indices (300), a peak intensity Hα$_1$ at a diffraction angle=14.5° on the crystal surface of a Miller indices (110), a peak intensity Hα$_2$ at a diffraction angle=17.2° on the crystal surface of a Miller indices (040), and a peak intensity Hα$_3$ at a diffraction angle=18.8° on the crystal surface of a Miller indices (130). Further, K$_2$=Hβ$_1$/(Hβ$_1$+Hα$_1$+Hα$_2$+Hα$_3$) was found from the above values.

To preclude the effect of X-ray scattering caused by the air, a scattering value measured in a state where no test piece was present was subtracted from the measured values of the peak intensities Hβ$_1$, Hα$_1$, Hα$_2$ and Hα$_3$ to thereby find the peak intensities Hβ$_1$, Hα$_1$, Hα$_2$ and Hα$_3$ stemming from the test pieces only. Peaks were detected relying on a 5-point differentiation. When no peak was detected, it was so regarded that no peak was present.

The test pieces were cut out in a square shape of a side of 7 mm such that a height h from the grounding surface was the center of the test pieces.

Figure 2:
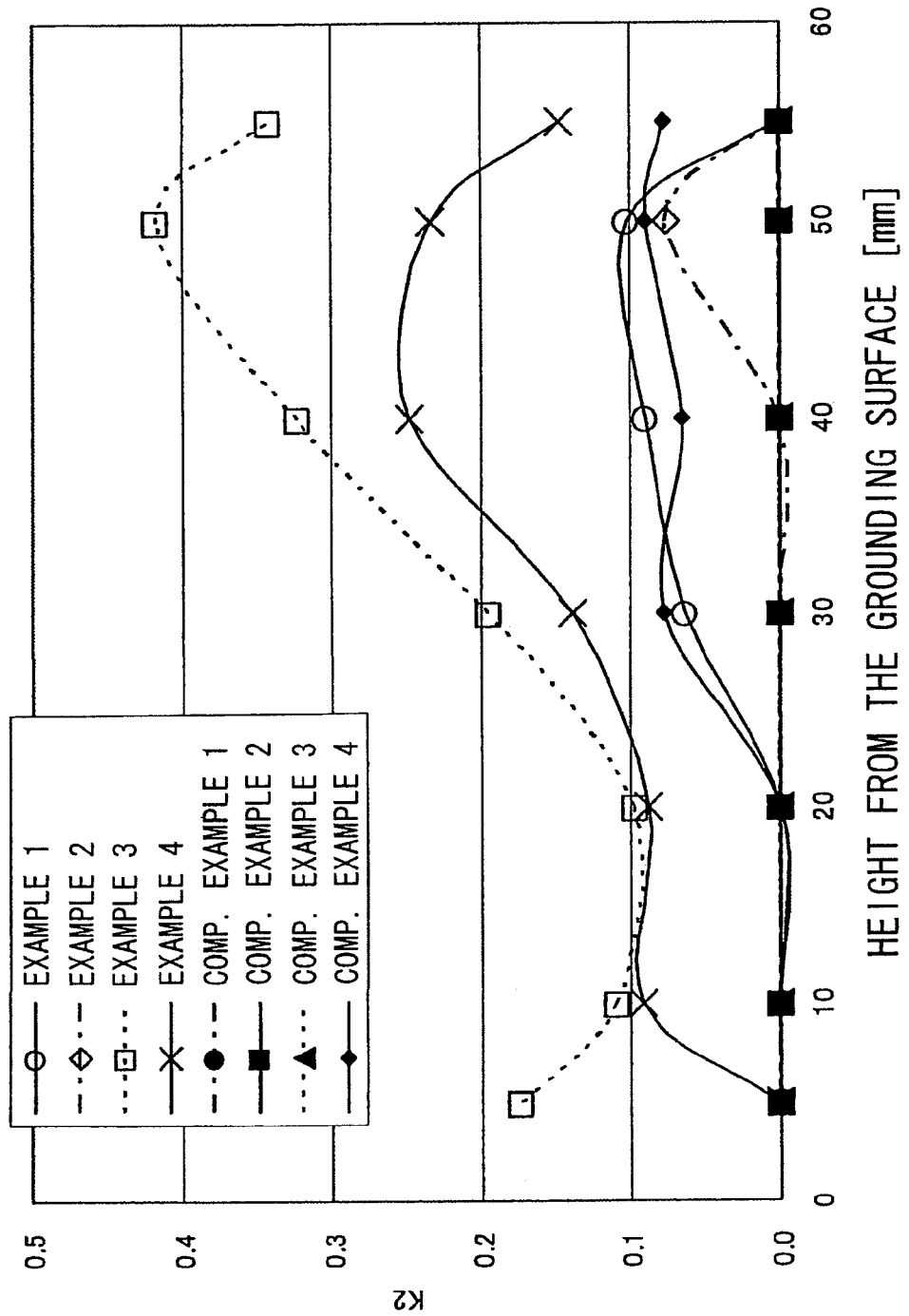
FIG. 2 is a diagram showing values of peak intensity ratios $K_2$ depending upon the heights of the cup-type containers formed by various molding methods.

The results were as shown in Table 2 and FIG. 2.

2. Evaluation of container strength.

By using a large Tensilon UCT-5T (manufactured by Orientec Co.), test pieces were cut out into a length of 15 mm and a width of 7 mm such that a position of the container in the direction of height from the grounding surface was the center.

The pieces of an initial length of 5 mm and a width of 7 mm were subjected to the tensile testing in the direction of height of the container and in the circumferential direction thereof under the environment of room temperature of 23° C. and a humidity of 50%, and were elongated until broken. The number of the measured samples was N=3, and an average value thereof was used as a measured result.

3. Evaluation of dimensional precision.

By using MAGNA-MIKE 8000 (manufactured by Panamatrics Co., U.S.A.), thickness was measured at three points in the direction of height of the cup-type container maintaining a distance of 120° in the circumferential direction, and differences between the maximum values and minimum values of thickness were regard as dispersion to evaluate the dimensional precision.

The results were as shown in Table 4.

Example 1

A random polypropylene resin (J226E manufactured by Prime Polymer Co., MFR (melt flow rate): 20 g/10 min.) was fed into a φ75 extruder (L/D=30), extruded under the conditions of an extruder temperature of 220° C., a die temperature of 220° C. and a resin pressure of 1.2 MPa, and was cut to obtain a molten resin mass. The molten resin mass was conveyed into a compression metal mold of 20° C., a portion of the flange was defined in advance, and the compression molding was conducted while varying the thickness of portions for molding the container body and the bottom portion to obtain a single-layer cup-type container of a sectional structure shown in FIG. 4(A) having a container body thickness of 0.5 to 0.6 mm, a container height of 61.5 mm, an outer diameter of the container flange of 95 mm, an inner volume of 220 cc and a weight of 9.2 g.

Next, the peak intensity ratios K$_1$ and K$_2$ of the single-layer cup-type container were found to evaluate the container strength and the dimensional precision.

Example 2

As a resin for inner and outer layers, a random polypropylene resin (J226E manufactured by Prime Polymer Co., MFR: 20 g/10 min.) was fed into a φ75 extruder (L/D=30), and was extruded under the conditions of an extruder temperature of 210° C. and a resin pressure of 1.2 MPa.

Further, an ethylene/vinyl alcohol copolymer resin (Eval SP474B manufactured by Kuraray Co.) was fed into a φ25 extruder (L/D=25), and was extruded under the conditions of an extruder temperature of 220° C. and a resin pressure of 2 MPa.

As an adhesive layer resin for adhering the inner and outer layers and the intermediate layer, further, a modified polypropylene resin (QF551 manufactured by Mitsui Kagaku Co.) was fed into a φ30 extruder (L/D=25), and was extruded under the conditions of an extruder temperature of. 220° C. and a resin pressure of 4.8 MPa.

The above inner and outer layers, intermediate layer and adhesive resin were met together in a die of 230° C., and were cut to obtain a multi-layer molten resin mass.

The multi-layer molten resin mass was compression molded under the same conditions as those of Example 1 to obtain a multi-layer cup-type container of the same shape as that of Example 1 having inner and outer layers of the random polypropylene resin, intermediate layer of the ethylene/vinyl alcohol copolymer resin, and the adhesive layer among the inner and outer layers and the intermediate layer of the modified polypropylene resin.

Next, measurement and evaluation were conducted in the same manner as in Example 1.

Example 3

A molten resin mass was obtained in the same manner as in Example 1 but using a homopolypropylene resin (J106G manufactured by Prime Polymer Co., MFR: 15 g/10 min.) and setting the extruder temperature to be 230° C. The molten resin mass was compression formed to obtain a similar single-layer cup-type container which was, then, measured and evaluated in the same manner as in Example 1.

Example 4

A molten resin mass was obtained in the same manner as in Example 1 but using a block polypropylene resin (BC3L manufactured by Nihon Polypro Co., MFR: 10 g/10 min.) and setting the extruder temperature to be 220° C. The molten resin mass was compression molded to obtain a similar single-layer cup-type container which was, then, measured and evaluated in the same manner as in Example 1.

Comparative Example 1

A polypropylene multi-layer cup-type container obtained by the compressed air molding and placed in the market was measured and evaluated, the cup-type container having the same shape as that of Example 1, having a container body thickness of 0.3 to 0.8 mm and having inner and outer layers of a homopolypropylene resin.

Comparative Example 2

A random polypropylene single-layer cup-type container obtained by the compressed air molding was measured and evaluated, the cup-type container being obtained by compression molding a sheet of the random polypropylene formed by the injection molding to have a thickness of 1 mm, the cup-type container further, having the same shape as that of Example 1 and a container body thickness of 0.3 to 0.8 mm.

Comparative Example 3

A homopolypropylene single-layer cup-type container obtained by the injection molding and placed in the market was measured and evaluated, the cup-type container having the same sectional structure as the one shown in FIG. 4(B), having a container body thickness of 0.7 to 0.8 mm, a container height (including a skirt portion of a height of 8 mm at the bottom) of 61 mm, an outer diameter of the container flange of 95 mm and an inner volume of 185 cc.

Comparative Example 4

A single-layer cup-type container of the same shape as that of Example 1 was formed by the compression molding in the same manner as in Example 1 by using the same homopolypropylene resin as that of Example 3 but defining, in advance, the clearance between the cavity and the core metal mold for defining the thickness of the container body portion and the bottom portion but without varying the clearance between the cavity and the core metal mold unlike that of Example 1. Measurement and evaluation were conducted in the same manner as in Example 1.

It will be learned from the results of Examples that the cup-type containers obtained by the compression molding of the present invention exhibit superior cup strength to the conventional cup-type containers obtained by the compressed air molding or the injection molding, and, further, exhibit superior dimensional precision to the conventional cup-type containers formed by the compressed air molding.

TABLE 1

| | Height from grounding surface: h(mm) | | | | | | | |
|---|---|---|---|---|---|---|---|---|
| | 5 | 10 | 20 | 30 | 40 | 50 | 55 (Stack portion) | 61 (Flange portion) |
| Ex. 1 | 0.92 | 0.87 | 0.91 | 0.94 | 0.95 | 0.93 | 0.96 | 1.08 |
| Ex. 2 | 0.84 | 0.86 | 0.89 | 0.92 | 0.92 | 0.89 | 0.94 | 1.10 |
| Ex. 3 | 0.89 | 0.91 | 0.92 | 0.96 | 0.91 | 0.95 | 0.84 | 1.27 |
| Ex. 4 | 0.73 | 0.72 | 0.76 | 0.85 | 0.77 | 0.68 | 0.70 | 0.53 |
| Comp. Ex. 1 | 2.03 | 1.88 | 1.51 | 1.40 | 1.36 | 1.39 | 1.33 | 2.65 |
| Comp. Ex. 2 | 1.59 | 1.53 | 1.48 | 1.35 | 1.39 | 1.31 | 1.06 | 0.84 |
| Comp. Ex. 3 | — | 0.47 | 0.50 | 0.49 | 0.50 | 0.60 | 0.82 | 4.22 |
| Comp. Ex. 4 | 0.88 | 0.92 | 1.04 | 1.02 | 1.12 | 1.02 | 1.03 | 1.44 |

TABLE 2

| | Height from grounding surface: h(mm) | | | | | | |
|---|---|---|---|---|---|---|---|
| | 5 | 10 | 20 | 30 | 40 | 50 | 55 (Stack portion) |
| Ex. 1 | 0 | 0 | 0 | 0.063 | 0.090 | 0.102 | 0 |
| Ex. 2 | 0 | 0 | 0 | 0 | 0 | 0.075 | 0 |
| Ex. 3 | 0.174 | 0.108 | 0.096 | 0.195 | 0.322 | 0.417 | 0.342 |
| Ex. 4 | 0 | 0.091 | 0.088 | 0.139 | 0.247 | 0.233 | 0.148 |
| Comp. Ex. 1 | 0 | 0 | 0 | 0 | 0 | 0 | 0 |
| Comp. Ex. 2 | 0 | 0 | 0 | 0 | 0 | 0 | 0 |
| Comp. Ex. 3 | — | 0 | 0 | 0 | 0 | 0 | 0 |
| Comp. Ex. 4 | 0 | 0 | 0 | 0.077 | 0.066 | 0.090 | 0.077 |

TABLE 3

| Height: h(mm) | 5 | 10 | 20 | 30 | 40 | 50 |
|---|---|---|---|---|---|---|
| Ex. 1 | | | | | | |
| Direction of height | 19.9 | 25.9 | 15.0 | 20.4 | 11.0 | 8.4 |
| Circumferential direction | 59.2 | 77.0 | 68.5 | 53.7 | 61.1 | 87.0 |
| Ex. 2 | | | | | | |
| Direction of height | 43.6 | 37.3 | 13.7 | 25.6 | 9.1 | 5.1 |
| Circumferential direction | 32.6 | 40.4 | 46.2 | 30.4 | 50.5 | 47.4 |

TABLE 3-continued

| Height: h(mm) | 5 | 10 | 20 | 30 | 40 | 50 |
|---|---|---|---|---|---|---|
| Ex. 3 | | | | | | |
| Direction of height | 7.1 | 8.3 | 12.1 | 8.9 | 7.0 | 10.9 |
| Circumferential direction | 36.2 | 7.2 | 40.1 | 34.7 | 40.8 | 42.7 |
| Ex. 4 | | | | | | |
| Direction of height | 36.9 | 32.7 | 35.6 | 14.0 | 13.2 | 12.3 |
| Circumferential direction | 63.3 | 83.4 | 61.7 | 72.2 | 82.5 | 70.1 |
| Comp. Ex. 1 | | | | | | |
| Direction of height | 3.3 | 1.4 | 51.0 | 43.2 | 52.8 | 19.6 |
| Circumferential direction | 2.4 | 2.7 | 1.8 | 1.5 | 1.9 | 2.1 |
| Comp. Ex. 2 | | | | | | |
| Direction of height | 11.8 | 21.4 | 20.0 | 11.3 | 11.8 | 8.0 |
| Circumferential direction | 25.8 | 33.5 | 47.2 | 52.2 | 53.5 | 26.0 |
| Comp. Ex. 3 | | | | | | |
| Direction of height | — | 1.3 | 1.7 | 2.4 | 1.6 | 1.0 |
| Circumferential direction | — | 1.2 | 0.9 | 1.6 | 2.1 | 1.0 |
| Comp. Ex. 4 | | | | | | |
| Direction of height | 11.7 | 9.5 | 7.8 | 9.0 | 29.1 | 3.6 |
| Circumferential direction | 1.8 | 3.8 | 3.8 | 3.8 | 2.6 | 2.8 |

Unit: mm

TABLE 4

| | Max. dispersion of thickness in the circumferential direction (mm) | Ave. dispersion of thickness in the circumferential direction (mm) |
|---|---|---|
| Ex. 1 | 0.027 | 0.019 |
| Ex. 2 | 0.038 | 0.031 |
| Ex. 3 | 0.049 | 0.043 |
| Ex. 4 | 0.060 | 0.040 |
| Comp. Ex. 1 | 0.255 | 0.095 |
| Comp. Ex. 2 | 0.100 | 0.078 |
| Comp. Ex. 3 | 0.038 | 0.035 |
| Comp. Ex. 4 | 0.021 | 0.013 |

The invention claimed is:

1. A cup-type polypropylene container obtained by compression-molding a polypropylene and having at least a body portion and a bottom portion, wherein the body portion has a thickness of not larger than 1.0 mm and a value $K_1$ in the body portion represented by the following formula, $$K_1 = P_1/P_2$$

wherein $P_1$ and $P_2$ are, respectively, a peak intensity at a diffraction angle $2\theta=14.5°$ and a peak intensity at a diffraction angle $2\theta=17.2°$ in the peak intensity distribution in the x-direction of a Debye ring obtained by measuring the diffraction intensity while defining the circumferential direction of a test piece cut out from the body portion of the container to be x, the direction of height thereof to be y, and by causing x-ray to fall perpendicularly to the xy-plane of the test piece, lying in a range of 0.5 to 1.0 and a value $K_2$ represented by the following formula, $$K_2 = H\beta_1/(H\beta_1 + H\alpha_1 + H\alpha_2 + H\alpha_3)$$

wherein $H\beta_1$, $H\alpha_1$, $H\alpha_2$ and $H\alpha_3$ are values obtained by subtracting the diffraction intensity of an amorphous portion from a peak intensity at a diffraction angle $2\theta=16.3°$, and from a peak intensity at a diffraction angle $2\theta=14.5°$, and from a peak intensity at a diffraction angle of $17.2°$ and from a peak intensity at a diffraction angle of $18.8°$ in the peak intensity distribution in the x-direction of a Debye ring obtained by measuring the diffraction intensity while defining the circumferential direction of a test piece cut out from the body portion of the container to be x, the direction of height thereof to be y, and by causing x-ray to fall perpendicularly to the xy-plane of the test piece, which is larger than 0 in at least part of the body portion.

2. The cup-type polypropylene container according to claim 1, wherein a flange portion is formed, the flange portion having a value $K_1$ of 0.5 to 1.5.

3. The cup-type polypropylene container according to claim 1, wherein at least the bottom portion and the body portion of the container have a multi-layer structure.

4. The cup-type polypropylene container according to claim 3, wherein the multi-layer structure includes at least inner and outer layers of the polypropylene and an intermediate layer of other thermoplastic resin, the inner and outer layers completely covering the intermediate layer preventing the intermediate layer from being exposed to the surface of the container.

5. The cup-type polypropylene container according to claim 4, wherein the intermediate layer comprises an ethylene/vinyl alcohol copolymer having an ethylene copolymerization ratio of less than 32 mol %.

6. A method of molding a cup-type polypropylene container by at least introducing a molten resin mass of a polypropylene into a lower metal mold and compressing the molten resin mass by an upper metal mold and the lower metal mold, wherein a portion that becomes an open end or a part thereof is defined by the metal mold after the molten resin mass is introduced into the lower metal mold but before the upper metal mold or the lower metal mold is moved, and the compression molding is effected at the time of moving the upper metal mold or the lower metal mold while varying the thickness of the portions that form the bottom portion and the body portion of the container.

7. The method according to claim 6, wherein the molten resin mass is the one having a multi-layer structure extruded by a die head having a multi-layer structure.

8. The method according to claim 6, wherein the cup-type polypropylene container is one obtained by compression-molding a polypropylene and having at least a body portion and a bottom portion, wherein the body portion has a thickness of not larger than 1.0 mm and a value $K_1$ in the body portion represented by the following formula, $$K_1 = P_1/P_2$$

wherein $P_1$ and $P_2$ are, respectively, a peak intensity at a diffraction angle $2\theta=14.5°$ and a peak intensity at a diffraction angle $2\theta=17.2°$ in the peak intensity distribution in the x-direction of a Debye ring obtained by measuring the diffraction intensity while defining the circumferential direction of a test piece cut out from the body portion of the container to be x, the direction of height thereof to be y, and by causing x-ray to fall perpendicularly to the xy-plane of the test piece, lying in a range of 0.5 to 1.0 and a value $K_2$ represented by the following formula, $$K_2 = H\beta_1/(H\beta_1 + H\alpha_1 + H\alpha_2 H\alpha_3)$$

wherein $H\beta_1$, $H\alpha_1$, $H\alpha_2$ and $H\alpha_3$ are values obtained by subtracting the diffraction intensity of an amorphous portion from a peak intensity at a diffraction angle $2\theta = 16.3°$, and from a peak intensity at a diffraction angle $2\theta = 14.5°$, and from a peak intensity at a diffraction angle of 17.2° and from a peak intensity at a diffraction angle of 18.8° in the peak intensity distribution in the x-direction of a Debye ring obtained by measuring the diffraction intensity while defining the circumferential direction of a test piece cut out from the body portion of the container to be x, the direction of height thereof to be y, and by causing x-ray to fall perpendicularly to the xy-plane of the test piece, which is larger than 0 in at least part of the body portion.

* * * * *